United States Patent
Nemoto

(10) Patent No.: US 7,344,129 B2
(45) Date of Patent: Mar. 18, 2008

(54) DAMPING METHOD AND DAMPING SYSTEM FOR HYBRID VEHICLE

(75) Inventor: Hirotomi Nemoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 11/075,032

(22) Filed: Mar. 8, 2005

(65) Prior Publication Data

US 2005/0200061 A1    Sep. 15, 2005

(30) Foreign Application Priority Data

Mar. 11, 2004 (JP) ............................. 2004-068522

(51) Int. Cl.
*F16F 13/26* (2006.01)
(52) U.S. Cl. .............................. 267/140.14; 267/140.15
(58) Field of Classification Search ........... 267/140.14, 267/140.15; 701/22, 99, 101, 111; 180/65.1, 180/65.2, 65.3, 65.4; 123/192.1
See application file for complete search history.

(56) References Cited

U.S. PATENT DOCUMENTS

| | | | |
|---|---|---|---|
| 6,020,697 A * | 2/2000 | Shimasaki et al. | 180/65.3 |
| 6,167,860 B1 * | 1/2001 | Tsukamoto | 123/192.1 |
| 6,408,968 B1 * | 6/2002 | Wakashiro et al. | 180/65.3 |
| 7,058,487 B2 * | 6/2006 | Hara et al. | 701/22 |
| 7,099,757 B2 * | 8/2006 | Niki et al. | 701/22 |
| 7,110,867 B2 * | 9/2006 | Imazu | 701/22 |
| 2006/0030979 A1 * | 2/2006 | Kuang et al. | 701/22 |

FOREIGN PATENT DOCUMENTS

| | | |
|---|---|---|
| JP | 11-089008 | 3/1999 |
| JP | 2001-057709 | 2/2001 |
| JP | 2003-113892 | 4/2003 |

* cited by examiner

*Primary Examiner*—Thomas Williams
(74) *Attorney, Agent, or Firm*—Carrier, Blackman & Assocaites, P.C.; William D. Blackman; Joseph P. Carrier

(57) ABSTRACT

A damping method for a hybrid vehicle in which a power unit consisting of an engine and a motor is supported in a vehicle body frame via an active vibration isolation support system includes: a step of firstly damping vibration of the power unit by the active vibration isolation support system; and a subsequent step of controlling operation of the motor to damp vibration that has not been eliminated by the active vibration isolation support system. Therefore, it is possible to prevent the damping effect from being degraded by interference between the damping control by the active vibration isolation support system and the damping control by the motor, and to reduce the total power consumption by preferentially operating the active vibration isolation support system which has low power consumption, and secondarily operating the motor which has high power consumption.

14 Claims, 4 Drawing Sheets

DAMPING METHOD AND DAMPING SYSTEM FOR HYBRID VEHICLE

RELATED APPLICATION DATA

The Japanese priority application No. 2004-68522 upon which the present application is based is hereby incorporated in its entirety herein by reference.

BACKGROUND OF THE INVENTION

1. Field of the Invention

The present invention relates to a damping method and a damping system for a hybrid vehicle in which a power unit consisting of an engine and a motor is supported in a vehicle body frame via an active vibration isolation support system, and vibration transmitted from the power unit to the vehicle body frame is damped by the motor and the active vibration isolation support system.

2. Description of the Related Art

Japanese Patent Application Laid-open No. 2003-113892 discloses an active vibration isolation support system that calculates a crank angular velocity from a time interval between crank pulses output every time a crankshaft rotates through a predetermined angle, calculates a crankshaft torque from a crank angular acceleration obtained by differentiating the crank angular velocity with respect to time, estimates an engine vibration state as a variation in the torque, and controls the supply of current to a coil of an actuator according to the engine vibration state, thus exhibiting a damping function.

Also, Japanese Patent Application Laid-open No. 2001-57709 discloses a hybrid vehicle equipped with an engine and a generator/motor as power sources for travel in which, when the generator/motor is operated as a motor or a generator while the engine is running, by making the generator/motor generate a damping torque that counteracts vibration of the engine, that is, torque variation of a crankshaft, the vibration transmitted from the engine to the vehicle body frame is damped.

In the hybrid vehicle in which the engine equipped integrally with the generator/motor is supported in the vehicle body frame via the active vibration isolation support system, since the damping force generated by the generator/motor and the damping force generated by the active vibration isolation support system are conventionally controlled independently, control by one might interfere with control by the other, so that a sufficient vibration damping effect might not be obtained. Furthermore, more electric power is consumed by the generator/motor for damping than is consumed by the active vibration isolation support system, and with the conventional control has a possibility that the power consumption of the generator/motor might increase more than necessary.

SUMMARY OF THE INVENTION

The present invention has been accomplished under the above-mentioned circumstances, and it is an object thereof to effectively carry out control of damping for an engine of a hybrid vehicle with low power consumption.

In order to attain this object, in accordance with a first aspect of the present invention, there is provided a damping method for a hybrid vehicle in which a power unit consisting of an engine and a motor is supported in a vehicle body frame via an active vibration isolation support system, and vibration transmitted from the power unit to the vehicle body frame is damped by the motor and the active vibration isolation support system, the method comprising: a step of damping vibration transmitted from the power unit to the vehicle body frame by the active vibration isolation support system by controlling the operation of the active vibration isolation support system according to a vibration state of the engine; and a step of damping vibration that has not been eliminated by the active vibration isolation support system by the motor.

In accordance with a second aspect of the present invention, in addition to the first aspect, the motor is a generator/motor.

In accordance with a third aspect of the present invention, there is provided a damping system for a hybrid vehicle in which a power unit consists of an engine and a motor, comprising: an active vibration isolation support system damping vibration transmitted from the power unit to a vehicle body frame that supports the power unit to the vehicle body frame, and controlled according to a vibration state of the engine; a motor which controls vibration that has not been eliminated by the active vibration isolation support system.

In accordance with a fourth aspect of the present invention, in addition to the third aspect, the motor is a generator/motor.

In accordance with the present invention, in the hybrid vehicle in which the power unit consisting of the engine and the motor is supported in the vehicle body frame via the active vibration isolation support system, vibration of the power unit is firstly damped by the active vibration isolation support system, and the vibration that has not been eliminated by the active vibration isolation support system is damped by the motor. Therefore, it is possible to prevent the damping effect from being degraded by interference between the damping control by the active vibration isolation support system and the damping control by the motor, and to reduce the total power consumption by preferentially operating the active vibration isolation support system which has low power consumption, and secondarily operating the motor which has high power consumption.

The above-mentioned object, other objects, characteristics, and advantages of the present invention will become apparent from an explanation of a preferred embodiment that will be described in detail below by reference to the attached drawings.

DESCRIPTION OF THE PREFERRED EMBODIMENT

Figure 1:
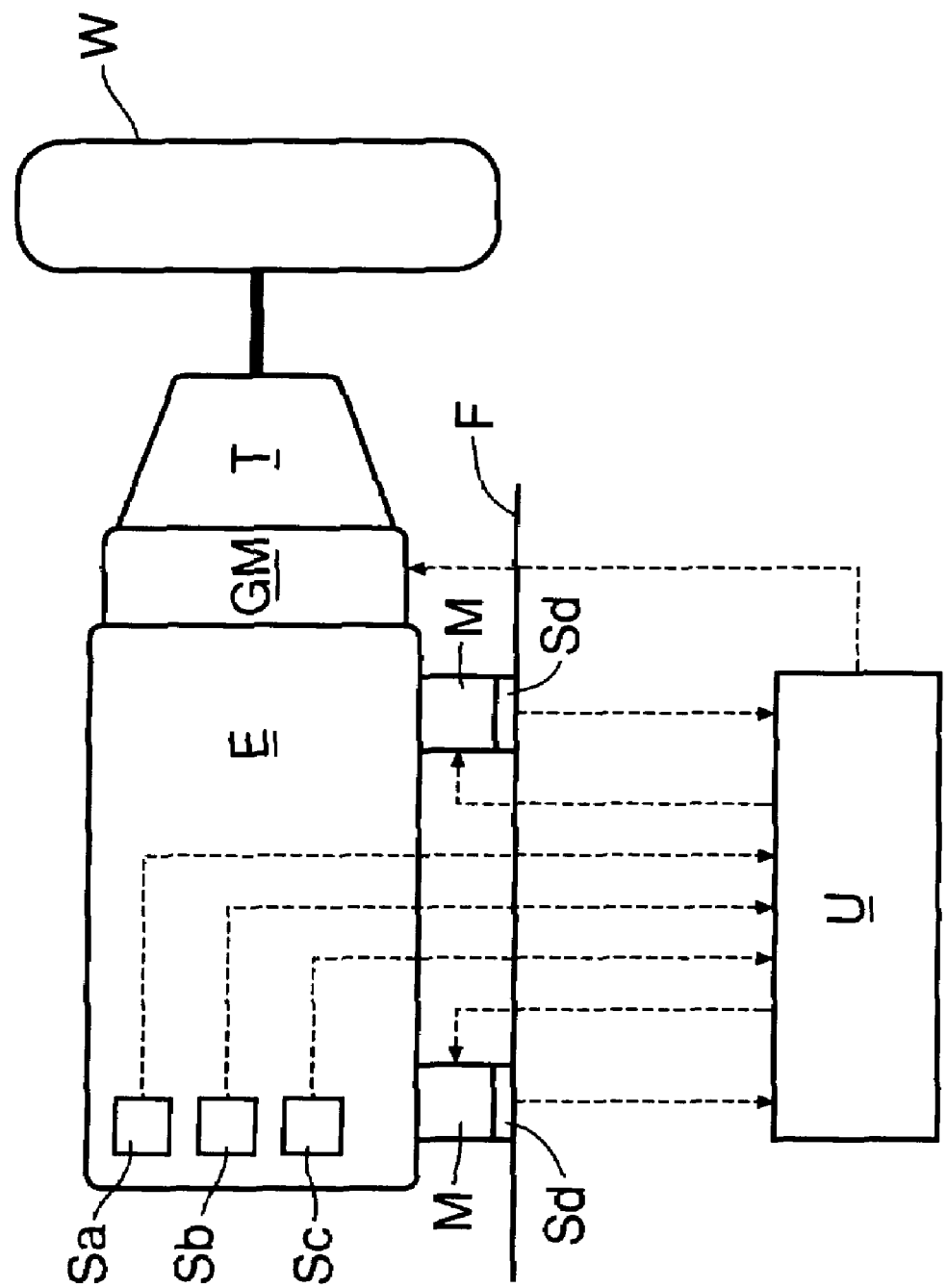
FIG. 1 is a block diagram showing a control system for a damping system of a hybrid vehicle, according to one embodiment of the present invention.

As shown in FIG. 1, integrally connected to an engine E of a hybrid vehicle are a generator/motor GM which functions as a motor or a generator, and an automatic or manual transmission T. A drive shaft W is driven by output from the transmission T. The engine E is supported in a vehicle body frame F via an active vibration isolation support system M (active control mount). A load sensor Sd for detecting a load transmitted from the engine E to the vehicle body frame F is disposed between the active vibration isolation support system M and the vehicle body frame F.

A load signal detected by the load sensor Sd, a crank pulse signal detected by a crank pulse sensor Sa of the engine E, an engine rotational speed signal (TDC signal) detected by an engine rotational speed sensor Sb, and a throttle opening degree signal (engine load signal) detected by a throttle opening degree sensor Sc, are input into an electronic control unit U for controlling operation of the active vibration isolation support system M and operation of the generator/motor GM. A crank pulse of the engine E is output 24 times per revolution of a crankshaft, that is, once every 15° of crank angle.

Figure 2:
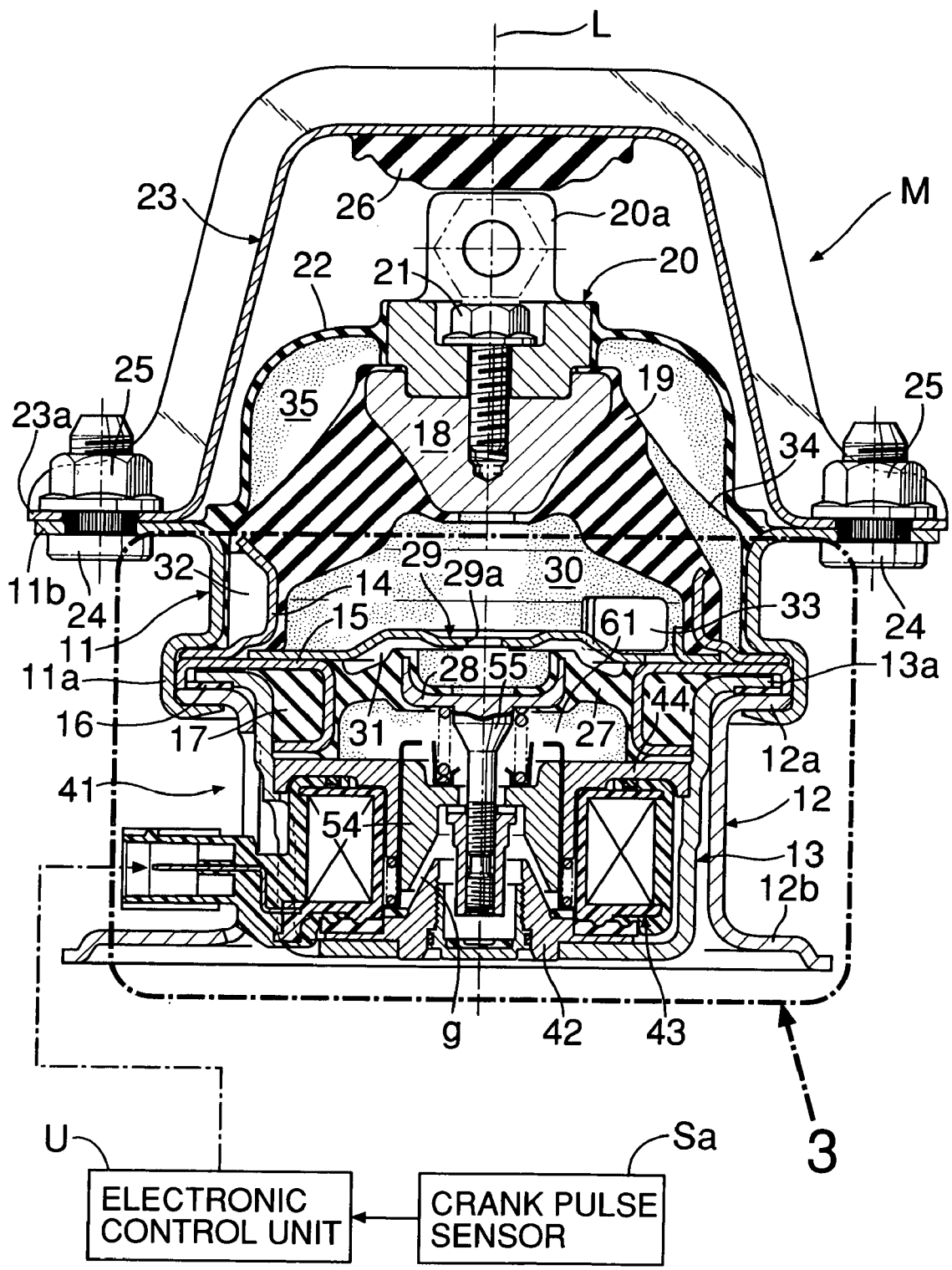
FIG. 2 is a vertical sectional view of an active vibration isolation support system.
Figure 3:
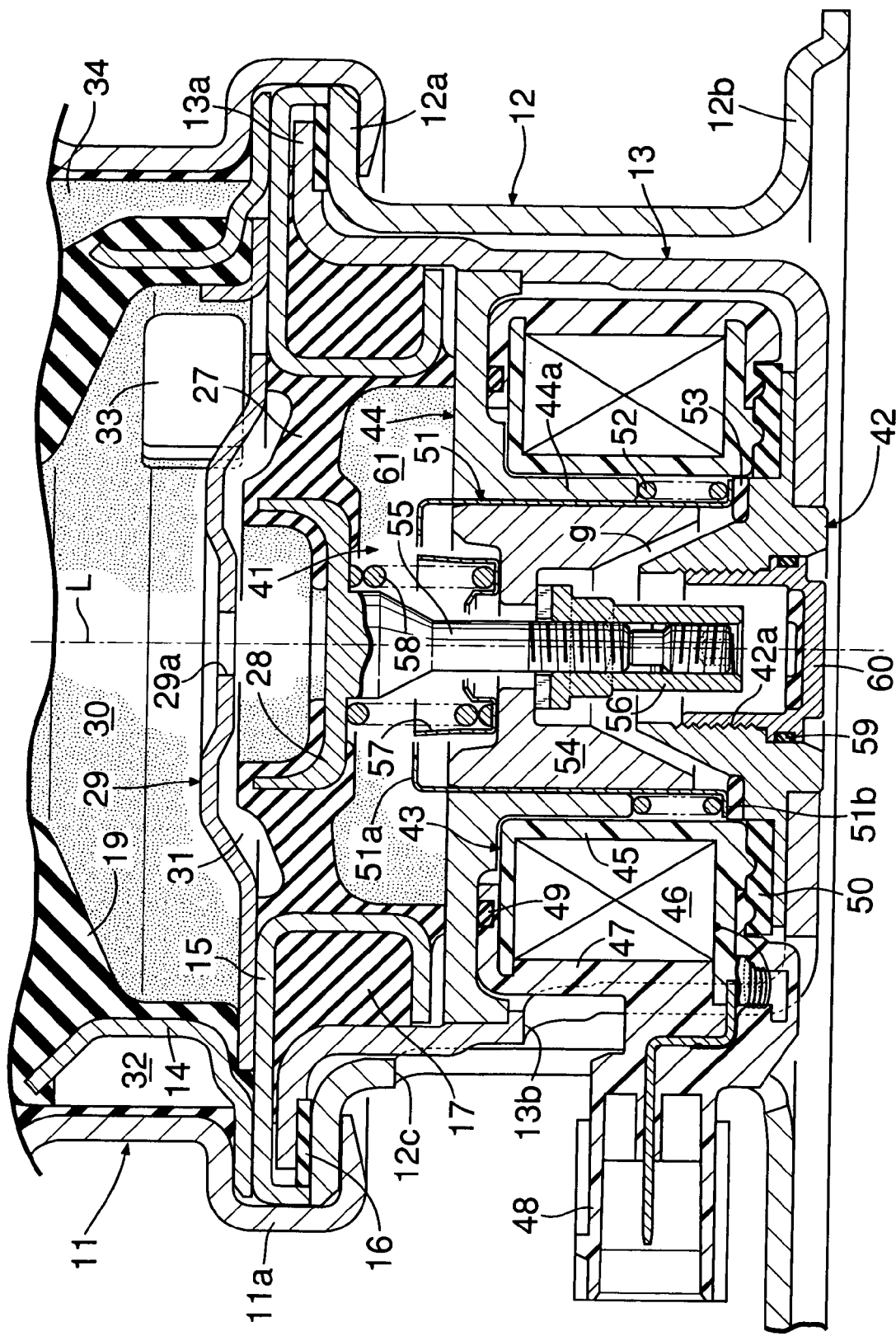
FIG. 3 is an enlarged view of part 3 in FIG. 2.

The structure of the active vibration isolation support system M is now described with reference to FIG. 2 and FIG. 3.

The active vibration isolation support system M has a structure that is substantially symmetrical with respect to an axis L. Between a flange portion 11a at the lower end of a substantially cylindrical upper housing 11 and a flange portion 12a at the upper end of a substantially cylindrical lower housing 12, a flange portion 13a on the outer periphery of an upwardly opening substantially cup-shaped actuator case 13, an outer peripheral portion of an annular first elastic body support ring 14, and an outer peripheral portion of an annular second elastic body support ring 15 are superimposed and joined by crimping. In this process, an annular first floating rubber 16 is disposed between the flange portion 12a of the lower housing 12 and the flange portion 13a of the actuator case 13, and an annular second floating rubber 17 is disposed between an upper part of the actuator case 13 and an inner face of the second elastic body support ring 15, whereby the actuator case 13 is floatingly supported such that it can move relative to the upper housing 11 and the lower housing 12.

The lower end and the upper end of a first elastic body 19 made of a thick rubber are joined by vulcanization bonding to the first elastic body support ring 14 and a first elastic body support boss 18 which is disposed on the axis L. A diaphragm support boss 20 is fixed to an upper face of the first elastic body support boss 18 by a bolt 21. An outer peripheral portion of a diaphragm 22 whose inner peripheral portion is joined by vulcanization bonding to the diaphragm support boss 20, is joined by vulcanization bonding to the upper housing 11. An engine mounting portion 20a integrally formed on an upper face of the diaphragm support boss 20 is fixed to the engine E (not illustrated). A vehicle body mounting portion 12b at the lower end of the lower housing 12 is fixed to the vehicle body frame F (not illustrated).

A flange portion 23a at the lower end of a stopper member 23 is joined by bolts 24 and nuts 25 to a flange portion 11b at the upper end of the upper housing 11. The engine mounting portion 20a projectingly provided on the upper face of the diaphragm support boss 20 faces a stopper rubber 26 attached to an upper inner face of the stopper member 23 so that the engine mounting portion 20a can abut against the stopper rubber 26. When a large load is input to the active vibration isolation support system M, the engine mounting portion 20a abuts against the stopper rubber 26, thereby suppressing excessive displacement of the engine E.

An outer peripheral portion of a second elastic body 27 made of a membranous rubber is joined by vulcanization bonding to the second elastic body support ring 15. A movable member 28 is embedded in and joined by vulcanization bonding to a central portion of the second elastic body 27. A disc-shaped partition member 29 is fixed between an upper face of the second elastic body support ring 15 and the outer peripheral portion of the first elastic body 19. A first liquid chamber 30 defined by the partition member 29 and the first elastic body 19, and a second liquid chamber 31 defined by the partition member 29 and the second elastic body 27, communicate with each other via a through hole 29a formed in a central portion of the partition member 29.

An annular through passage 32 is formed between the first elastic body support ring 14 and the upper housing 11, one end of the through passage 32 communicates with the first liquid chamber 30 via a through hole 33, and the other end of the through passage 32 communicates via a through hole 34 with a third liquid chamber 35 defined by the first elastic body 19 and the diaphragm 22.

The structure of an actuator 41 for driving the movable member 28 is now described.

A stationary core 42, a coil assembly 43, and a yoke 44 are mounted within the actuator case 13 in sequence from the bottom to the top. The coil assembly 43 is formed from a bobbin 45 disposed on the outer periphery of the stationary core 42, a coil 46 wound around the bobbin 45, and a coil cover 47 covering the outer periphery of the coil 46. The coil cover 47 is formed integrally with a connector 48 running through openings 13b and 12c formed in the actuator case 13 and the lower housing 12 to extend outside.

A seal 49 is disposed between an upper face of the coil cover 47 and a lower face of the yoke 44. A seal 50 is disposed between a lower face of the bobbin 45 and an upper face of the stationary core 42. These seals 49 and 50 can prevent water or dust from entering an internal space 61 of the actuator 41 via the openings 13b and 12c formed in the actuator case 13 and the lower housing 12.

A thin cylindrical bearing member 51 is fitted in a vertically slidable manner to an inner peripheral face of a cylindrical portion 44a of the yoke 44. An upper flange 51a and a lower flange 51b are formed at the upper end and the lower end respectively of the bearing member 51, the upper flange 51a being bent radially inward, and the lower flange 51b being bent radially outward. A set spring 52 is disposed in a compressed state between the lower flange 51b and the lower end of the cylindrical portion 44a of the yoke 44. The bearing member 51 is supported by the yoke 44 by the lower flange 51b being pressed against the upper face of the stationary core 42 via an elastic body 53 by means of the elastic force of the set spring 52.

A substantially cylindrical movable core 54 is fitted in a vertically slidable manner to an inner peripheral face of the bearing member 51. A rod 55 extending downward from the center of the movable member 28 runs loosely through the center of the movable core 54, and a nut 56 is tightened around the lower end of the rod 55. A set spring 58 is disposed in a compressed state between a spring seat 57 provided on an upper face of the movable core 54 and a lower face of the movable member 28. The movable core 54 is fixed by being pressed against the nut 56 by means of the elastic force of the set spring 58. In this state, the lower face of the movable core 54 and the upper face of the stationary core 44 face each other across a conical air gap g. The rod 55 and the nut 56 are loosely fitted into an opening 42a formed in the center of the stationary core 42, and this opening 42a is blocked by a plug 60 via a seal 59.

The operation of the embodiment of the present invention having the above-mentioned arrangement is now described.

The operation of the active vibration isolation support system M is firstly described. When low frequency engine shake vibration occurs while the automobile is traveling, the first elastic body 19 is deformed by a load input from the engine E via the diaphragm support boss 20 and the first elastic body support boss 18, thus changing the capacity of the first liquid chamber 30, so that a liquid thereby moves to and fro between the first liquid chamber 30 and the third liquid chamber 35 via the through passage 32. When the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set so that a low spring constant and high attenuation force are exhibited in the frequency region of the engine shake vibration, and it is therefore possible to effectively suppress the vibration transmitted from the engine E to the vehicle body frame F.

In the frequency region of the engine shake vibration, the actuator 41 is maintained in a nonoperating state.

When there is vibration having a frequency higher than that of the above-mentioned engine shake vibration, that is, vibration during idling or vibration during cylinder cut-off due to rotation of the engine crankshaft, the liquid within the through passage 32 providing communication between the first liquid chamber 30 and the third liquid chamber 35 becomes stationary and a vibration isolation function cannot be exhibited; the actuator 41 is therefore driven to exhibit a vibration isolation function.

In order to operate the actuator 41 of the active vibration isolation support system M to exhibit the vibration isolation function, the electronic control unit U controls the supply of current to the coil 46 based on a signal from the crank pulse sensor Sa.

Figure 4:
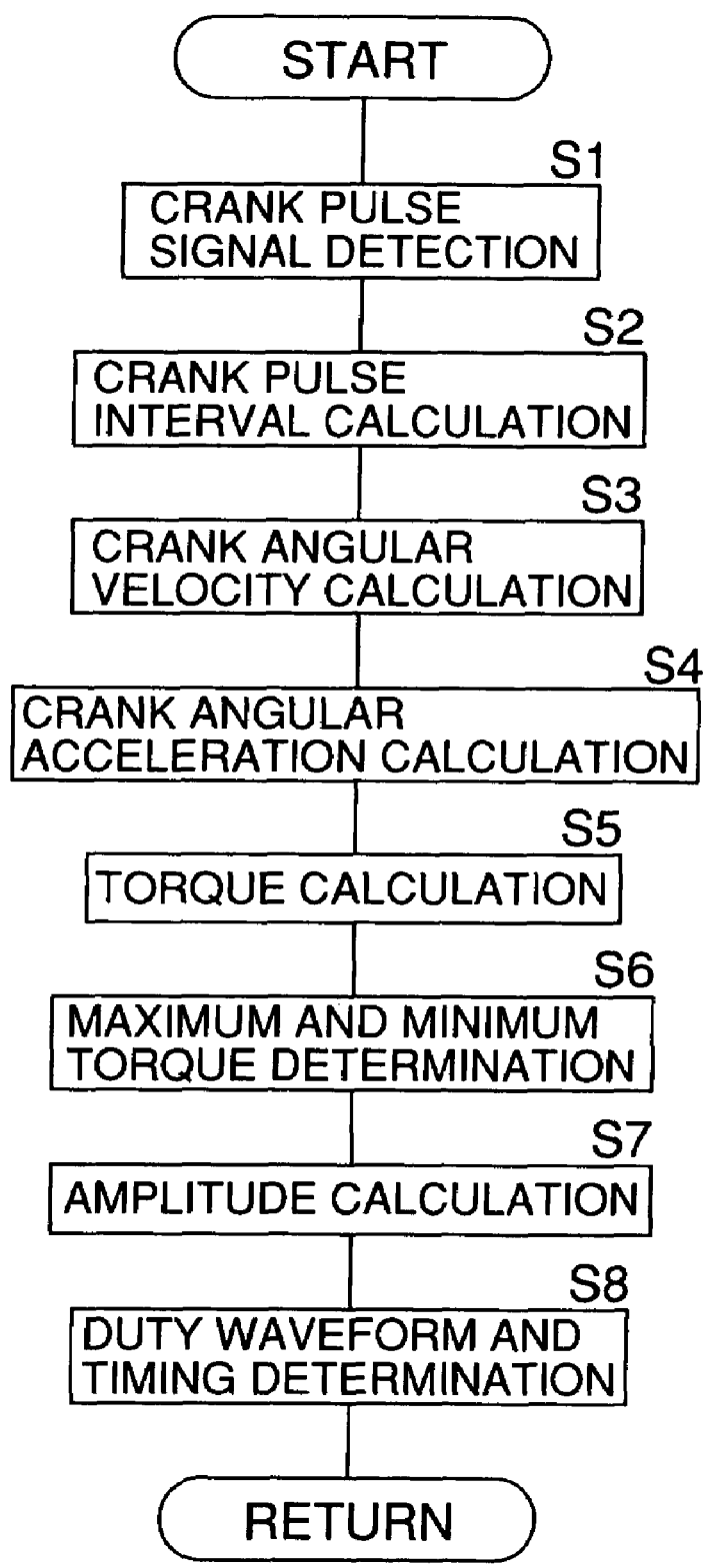
FIG. 4 is a flow chart for explaining the operation of the active vibration isolation support system.

Specifically, referring to the flow chart of FIG. 4, firstly in step S1 crank pulses output from the crank pulse sensor Sa every 15° of crank angle are read in, and in step S2 the crank pulses thus read in are compared with a reference crank pulse (TDC signal of a specified cylinder) so as to calculate a time interval between the crank pulses. In the subsequent step S3, a crank angular velocity ω is calculated by dividing the 15° crank angle by the time interval between the crank pulses, and in step S4 a crank angular acceleration dω/dt is calculated by differentiating the crank angular velocity ω with respect to time. In the subsequent step S5, a torque Tq around the engine crankshaft is calculated from $$Tq = I \times d\omega/dt,$$

where I is the moment of inertia around the engine crankshaft. This torque Tq becomes 0 if it is assumed that the crankshaft rotates at a constant angular velocity ω, but in an expansion stroke the angular velocity ω increases by acceleration of a piston, and in a compression stroke the angular velocity ω decreases by deceleration of the piston, thus generating a crank angular acceleration dω/dt; as a result, a torque Tq proportional to the crank angular acceleration dω/dt is generated.

In the subsequent step S6 a maximum value and a minimum value of two successive torque values are determined, and in step S7 an amplitude at the position of the active vibration isolation support system M supporting the engine E is calculated as the difference between the maximum value and the minimum value of the torque, that is, a torque variation. In step S8, a duty waveform and timing (phase) of current applied to the coil 46 of the actuator 41 are determined.

When the engine E moves downward relative to the vehicle body frame F and the first elastic body 19 is deformed downwardly to decrease the capacity of the first liquid chamber 30, energizing the coil 46 of the actuator 41 with matching timing causes the movable core 54 to move downward toward the stationary core 42 by means of the attractive force generated in the air gap g, so that the second elastic body 27 is deformed downwardly by being drawn by the movable member 28 connected to the movable core 54 via the rod 55. As a result, since the capacity of the second liquid chamber 31 increases, the liquid in the first liquid chamber 30, which is compressed by the load from the engine E, passes through the through hole 29a of the partition member 29 and flows into the second liquid chamber 31, thereby reducing the load transmitted from the engine E to the vehicle body frame F.

Subsequently, when the engine E moves upward relative to the vehicle body frame F and the first elastic body 19 is deformed upwardly to increase the capacity of the first liquid chamber 30, de-energizing the coil 46 of the actuator 41 with matching timing causes the attractive force generated in the air gap g to disappear and the movable core 54 to move freely, so that the second elastic body 27 that has been deformed downwardly recovers upwardly by its own elastic recovery force. As a result, the capacity of the second liquid chamber 31 decreases, and thus the liquid in the second liquid chamber 31 passes through the through hole 29a of the partition member 29 and flows into the first liquid chamber 30, thereby allowing the engine E to move upward relative to the vehicle body frame F.

In this way, by energizing and de-energizing the coil 46 of the actuator 41 in accordance with the engine vibration cycle, it is possible to generate an active damping force for preventing the engine vibration from being transmitted to the vehicle body frame F.

As described above, even when the active vibration isolation support system M exhibits its damping function, it is difficult to completely eliminate the vibration transmitted from the engine E to the vehicle body frame F, but the remaining vibration is damped by the electronic control unit U controlling the generator/motor GM. That is, the electronic control unit U estimates the vibration of the engine E based on the engine rotational speed signal (TDC signal) detected by the engine rotational speed sensor Sb and the throttle opening degree signal (engine load signal) detected by the throttle opening degree sensor Sc; and controls a drive torque (or a braking torque during regenerative braking) generated by the generator/motor GM to generate a damping force for counteracting the estimated vibration.

However, since part of the vibration of the engine E has already been counteracted by the operation of the active vibration isolation support system M, the level of the remaining vibration transmitted from the engine E to the vehicle body frame F is estimated based on the load detected by the load sensor Sd, and the level of the damping force generated by the generator/motor GM is controlled so as to counteract this remaining vibration.

In this way, since the vibration of the engine E is firstly damped by means of the damping force generated by the active vibration isolation support system M, and the vibration that has not been eliminated by the active vibration isolation support system M is damped by means of the damping force of the generator/motor GM, it is possible to prevent the damping effect from being degraded due to interference between the damping control by the active vibration isolation support system M and the damping control by the generator/motor GM, thereby carrying out effective damping control. Moreover, since the active vibration isolation support system M which has low power consumption is operated preferentially, and the generator/motor GM which has high power consumption is secondarily operated, it is possible to reduce the power consumption required for the damping control and to minimize degradation in durability due to heat generated by the generator/motor GM.

Although an embodiment of the present invention has been described in detail above, the present invention can be modified in design in a variety of ways without departing from the subject matter of the present invention.

For example, the active vibration isolation support system M is not limited to one with an enclosed liquid, and may be one employing a piezo element.

Furthermore, in the embodiment, the active vibration isolation support system M supports the engine E directly in the vehicle body frame F, but the engine E may be supported indirectly in the vehicle body frame F via the generator/motor GM or the transmission T which is integral with the engine E.

Moreover, instead of the load sensor Sd of the embodiment, an active noise sensor for estimating vehicle body vibration from a noise level may be employed.

What is claimed is:

1. A damping method for a hybrid vehicle in which a power unit consisting of an engine and a motor is supported in a vehicle body frame via an active vibration isolation support system, and vibration transmitted from the power unit to the vehicle body frame is damped by the motor and the active vibration isolation support system, the method comprising:
a step of damping vibration transmitted from the power unit to the vehicle body frame by the active vibration isolation support system by controlling the operation of the active vibration isolation support system according to a vibration state of the engine; and
a step of damping vibration in excess of that eliminated by the active vibration isolation support system by controlling operation of the motor.

2. The damping method according to claim 1, wherein the motor is a generator/motor.

3. The damping method according to claim 1, wherein the step of damping by controlling the operation of the active vibration isolation support system is performed prior to the step of damping by controlling operation of the motor.

4. The damping method according to claim 1, wherein
the step of damping vibration transmitted from the power unit to the vehicle body frame by the active vibration isolation support system involves controlling the operation of the active vibration isolation support system according to a vibration cycle of the engine; and
the step of damping vibration by controlling operation of the motor involves estimating a remaining vibration transmitted from the engine to the vehicle body frame based on a detected load transmitted from the engine to the vehicle body frame, and controlling the operation of the motor to counteract the estimated remaining vibration.

5. The damping method according to claim 1, wherein the operation of the motor is controlled by estimating the vibration of the engine based on at least one of engine rotational speed and a throttle opening degree, and then controlling a torque of the motor so as to generate a damping force to counteract the estimated vibration.

6. A damping system for a hybrid vehicle having a power unit consisting of an engine and a motor, comprising:
a controller; and
an active vibration isolation support system which supports the power unit to a vehicle body frame and damps vibration transmitted from the power unit to the vehicle body frame according to a vibration state of the engine;
wherein the controller controls operation of the motor so as to damp vibration in excess of that eliminated by the active vibration isolation support system.

7. The damping system according to claim 6, wherein the motor is a generator/motor.

8. The damping system according to claim 6, wherein the controller controls the operation of the motor so as to damp vibration that has not been eliminated by the active vibration isolation support system only after controlling the active vibration isolation support system to damp vibration transmitted from the power unit to the vehicle body frame according to the vibration state of the engine.

9. The damping system according to claim 6, wherein the controller:
determines a vibration cycle of the engine;
controls the active vibration isolation support system according to the determined vibration cycle of the engine;
estimates a remaining vibration transmitted from the engine to the vehicle body frame based on a detected load transmitted from the engine to the vehicle body frame; and
controls the operation of the motor to counteract the estimated remaining vibration.

10. The damping system according to claim 6, wherein the controller controls the operation of the motor by estimating the vibration of the engine based on at least one of engine rotational speed and a throttle opening degree, and then controlling a torque of the motor so as to generate a damping force to counteract the estimated vibration.

11. A damping system for a hybrid vehicle having a power unit consisting of an engine and a motor, comprising:
an active vibration isolation support system which supports the power unit on a vehicle body frame; and
a controller;
wherein the controller firstly controls said active vibration isolation support system to damp vibration transmitted from the power unit to the vehicle body frame according to a vibration state of the engine; and
the controller thereafter controls operation of the motor so as to damp vibration that in excess of that eliminated by the active vibration isolation support system, thereby preventing interference between the damping control by the active vibration isolation support system and the damping control by the motor.

12. The damping system according to claim 11, wherein the motor is a generator/motor.

13. The damping system according to claim 11, wherein the controller:
determines a vibration cycle of the engine;
controls the active vibration isolation support system according to the determined vibration cycle of the engine;
estimates a remaining vibration transmitted from the engine to the vehicle body frame based on a detected load transmitted from the engine to the vehicle body frame; and
controls the operation of the motor to counteract the estimated remaining vibration.

14. The damping system according to claim 11, wherein the controller controls the operation of the motor by estimating the vibration of the engine based on at least one of engine rotational speed and a throttle opening degree, and then controlling a torque of the motor so as to generate a damping force to counteract the estimated vibration.

* * * * *